US010275984B2

(12) United States Patent
Roth

(10) Patent No.: US 10,275,984 B2
(45) Date of Patent: Apr. 30, 2019

(54) VIDEO GAMING DEVICE HAVING A SYSTEM AND METHOD FOR COMPLETING WAGERS

(71) Applicant: IGT, Las Vegas, NV (US)

(72) Inventor: Russell Robert Roth, Las Vegas, NV (US)

(73) Assignee: IGT, Las Vegas, NV (US)

(*) Notice: Subject to any disclaimer, the term of this patent is extended or adjusted under 35 U.S.C. 154(b) by 889 days.

(21) Appl. No.: 14/455,523

(22) Filed: Aug. 8, 2014

(65) Prior Publication Data

US 2014/0349729 A1 Nov. 27, 2014

Related U.S. Application Data

(63) Continuation of application No. 11/305,796, filed on Dec. 16, 2005, now Pat. No. 9,613,491.

(60) Provisional application No. 60/636,733, filed on Dec. 16, 2004.

(51) Int. Cl.
*A63F 13/00* (2014.01)
*G07F 17/32* (2006.01)

(52) U.S. Cl.
CPC .......... *G07F 17/3255* (2013.01); *G07F 17/32* (2013.01); *G07F 17/329* (2013.01); *G07F 17/3244* (2013.01); *G07F 17/3246* (2013.01); *G07F 17/3281* (2013.01); *G07F 17/3288* (2013.01); *G07F 17/3293* (2013.01)

(58) Field of Classification Search
CPC ............................ G07F 17/32; G07F 17/3262
USPC .................................................... 463/25, 29
See application file for complete search history.

(56) References Cited

U.S. PATENT DOCUMENTS

| | | | |
|---|---|---|---|
| 3,708,219 | A | 1/1973 | Forlini et al. |
| 3,931,504 | A | 1/1976 | Jacoby |
| 4,333,715 | A | 6/1982 | Brooks |
| 4,430,728 | A | 2/1984 | Beitel et al. |
| 4,454,594 | A | 6/1984 | Heffron et al. |
| 4,517,558 | A | 5/1985 | Davids |
| 4,607,844 | A | 8/1986 | Fullerton |
| 4,621,814 | A | 11/1986 | Stepan et al. |
| 4,659,182 | A | 4/1987 | Aizawa |
| 4,718,672 | A | 1/1988 | Okada |

(Continued)

FOREIGN PATENT DOCUMENTS

| | | |
|---|---|---|
| AU | 199650576 | 4/1997 |
| AU | 775882 | 8/2004 |

(Continued)

OTHER PUBLICATIONS

U.S. Appl. No. 60/537,755 System and Methods for Improved Cashless Gaming Provisional Patent Application (9 Pages).*

*Primary Examiner* — David L Lewis
*Assistant Examiner* — Robert E Mosser
(74) *Attorney, Agent, or Firm* — Neal, Gerber & Eisenberg LLP

(57) ABSTRACT

The present invention is a method for completing wagers and purchases from a gaming device when a player presses or selects the cash out feature on the device. The present invention provides for a more convenient method for players to make additional gaming wagers and purchases directly from a gaming device. The player can select the option to make a wager on a sporting event, lottery game, Keno game or any game of chance offered by the gaming establishment. The present invention also enables the player to select the option to make purchases for among other things show tickets, sporting events, movies, retail items or even credit the proceeds from the gaming device to the players hotel room account.

11 Claims, 7 Drawing Sheets

(56) References Cited

U.S. PATENT DOCUMENTS

| | | | |
|---|---|---|---|
| 4,856,787 | A | 8/1989 | Itkis |
| 4,911,449 | A | 3/1990 | Dickinson et al. |
| 4,912,548 | A | 3/1990 | Shanker et al. |
| 5,086,354 | A | 2/1992 | Bass et al. |
| 5,113,272 | A | 5/1992 | Reamey |
| 5,132,839 | A | 7/1992 | Travis |
| 5,319,491 | A | 6/1994 | Selbrede |
| 5,342,047 | A | 8/1994 | Heidel et al. |
| 5,364,100 | A | 11/1994 | Ludlow et al. |
| 5,375,830 | A | 12/1994 | Takemoto et al. |
| 5,376,587 | A | 12/1994 | Buchmann et al. |
| 5,393,061 | A | 2/1995 | Manship et al. |
| 5,467,893 | A | 11/1995 | Landis, II et al. |
| 5,539,547 | A | 7/1996 | Ishii et al. |
| 5,580,055 | A | 12/1996 | Hagiwara |
| 5,585,821 | A | 12/1996 | Ishikura et al. |
| 5,589,980 | A | 12/1996 | Bass et al. |
| 5,643,086 | A | 7/1997 | Alcorn et al. |
| 5,655,961 | A | 8/1997 | Acres et al. |
| 5,745,197 | A | 4/1998 | Leung et al. |
| 5,752,881 | A | 5/1998 | Inoue |
| 5,761,647 | A | 6/1998 | Boushy |
| 5,764,317 | A | 6/1998 | Sadnovik et al. |
| 5,851,149 | A | 12/1998 | Xidos et al. |
| 5,910,046 | A | 6/1999 | Wada et al. |
| 5,923,307 | A | 7/1999 | Hogle, IV |
| 5,951,397 | A | 9/1999 | Dickinson |
| 5,956,180 | A | 9/1999 | Bass et al. |
| 5,967,893 | A | 10/1999 | Lawrence et al. |
| 6,001,016 | A | 12/1999 | Walker et al. |
| 6,015,346 | A | 1/2000 | Bennett |
| 6,027,115 | A | 2/2000 | Griswold et al. |
| 6,050,895 | A | 4/2000 | Luciano et al. |
| 6,054,969 | A | 4/2000 | Haisma |
| 6,059,658 | A | 5/2000 | Mangano et al. |
| 6,068,552 | A | 5/2000 | Walker et al. |
| 6,099,408 | A | 8/2000 | Schneier et al. |
| 6,104,815 | A | 8/2000 | Alcorn et al. |
| 6,106,396 | A | 8/2000 | Alcorn et al. |
| 6,110,041 | A | 8/2000 | Walker et al. |
| 6,113,495 | A | 9/2000 | Walker et al. |
| 6,135,884 | A | 10/2000 | Hedrick et al. |
| 6,149,522 | A | 11/2000 | Alcorn et al. |
| 6,159,098 | A | 12/2000 | Slomiany et al. |
| 6,190,256 | B1 | 2/2001 | Walker et al. |
| 6,213,875 | B1 | 4/2001 | Suzuki |
| 6,244,596 | B1 | 6/2001 | Kondratjuk |
| 6,251,014 | B1 | 6/2001 | Stockdale et al. |
| 6,252,707 | B1 | 6/2001 | Kleinberger et al. |
| 6,253,374 | B1 | 6/2001 | Dresevic et al. |
| 6,254,481 | B1 | 7/2001 | Jaffe |
| 6,293,866 | B1 | 9/2001 | Walker et al. |
| 6,315,666 | B1 | 11/2001 | Mastera et al. |
| 6,337,513 | B1 | 1/2002 | Clevenger et al. |
| 6,347,996 | B1 | 2/2002 | Gilmore et al. |
| 6,368,216 | B1 | 4/2002 | Hedrick et al. |
| 6,379,244 | B1 | 4/2002 | Sagawa et al. |
| 6,398,220 | B1 | 6/2002 | Inoue |
| 6,416,827 | B1 | 7/2002 | Chakrapani et al. |
| 6,444,496 | B1 | 9/2002 | Edwards et al. |
| 6,445,185 | B1 | 9/2002 | Damadian et al. |
| 6,446,257 | B1 | 9/2002 | Pradhan et al. |
| 6,449,687 | B1 | 9/2002 | Moriya |
| 6,453,319 | B1 | 9/2002 | Mattis et al. |
| 6,454,648 | B1 | 9/2002 | Kelly et al. |
| 6,491,583 | B1 | 12/2002 | Gauselmann |
| 6,503,147 | B1 | 1/2003 | Stockdale et al. |
| 6,511,375 | B1 | 1/2003 | Kaminkow |
| 6,512,559 | B1 | 1/2003 | Hashimoto et al. |
| 6,514,141 | B1 | 2/2003 | Kaminkow et al. |
| 6,517,433 | B2 | 2/2003 | Loose et al. |
| 6,517,437 | B1 | 2/2003 | Wells et al. |
| 6,547,664 | B2 | 4/2003 | Sauders |
| 6,575,541 | B1 | 6/2003 | Hedrick et al. |
| 6,585,591 | B1 | 7/2003 | Baerlocher et al. |
| 6,620,047 | B1 | 9/2003 | Alcorn et al. |
| D480,961 | S | 10/2003 | Deadman |
| 6,645,077 | B2 | 11/2003 | Rowe |
| 6,646,695 | B1 | 11/2003 | Gauselmann |
| 6,652,378 | B2 | 11/2003 | Cannon et al. |
| 6,659,864 | B2 | 12/2003 | McGahn et al. |
| 6,661,425 | B1 | 12/2003 | Hiroaki |
| 6,695,703 | B1 | 2/2004 | McGahn |
| 6,702,675 | B2 | 3/2004 | Poole et al. |
| 6,712,694 | B1 | 3/2004 | Nordman |
| 6,715,756 | B2 | 4/2004 | Inoue |
| 6,717,728 | B2 | 4/2004 | Putilin |
| 6,722,979 | B2 | 4/2004 | Gilmore et al. |
| 6,802,777 | B2 | 10/2004 | Seelig et al. |
| 6,811,486 | B1 | 11/2004 | Luciano, Jr. |
| 6,817,945 | B2 | 11/2004 | Seelig et al. |
| 6,817,946 | B2 | 11/2004 | Motegi et al. |
| 6,887,157 | B2 | 5/2005 | LeMay et al. |
| 6,890,259 | B2 | 5/2005 | Breckner et al. |
| 6,906,762 | B1 | 6/2005 | Witehira et al. |
| 6,937,298 | B2 | 8/2005 | Okada |
| 6,969,319 | B2 | 11/2005 | Rowe et al. |
| 7,022,017 | B1 | 4/2006 | Halbritter et al. |
| 7,095,180 | B2 | 8/2006 | Emslie et al. |
| 7,097,560 | B2 | 8/2006 | Okada |
| 7,128,647 | B2 | 10/2006 | Muir et al. |
| 7,159,865 | B2 | 1/2007 | Okada |
| 7,160,187 | B2 | 1/2007 | Loose et al. |
| 7,204,753 | B2 | 4/2007 | Ozaki et al. |
| 7,207,883 | B2 | 4/2007 | Nozaki et al. |
| 7,220,181 | B2 | 5/2007 | Okada |
| 7,252,288 | B2 | 8/2007 | Seelig et al. |
| 7,255,643 | B2 | 8/2007 | Ozaki et al. |
| 7,309,284 | B2 | 12/2007 | Griswold et al. |
| 7,322,884 | B2 | 1/2008 | Emori et al. |
| 7,329,181 | B2 | 2/2008 | Hoshino et al. |
| 7,562,873 | B1 * | 7/2009 | Luciano, Jr. ............ G07F 17/32 273/139 |
| 7,618,319 | B2 | 11/2009 | Casey et al. |
| 7,619,585 | B2 | 11/2009 | Bell et al. |
| 7,730,413 | B1 | 6/2010 | Engel et al. |
| 7,918,734 | B2 | 4/2011 | Gould |
| 8,029,351 | B2 | 10/2011 | Kosaka et al. |
| 8,131,649 | B2 | 3/2012 | Yen et al. |
| 2001/0013681 | A1 | 8/2001 | Bruzzese et al. |
| 2002/0035541 | A1 * | 3/2002 | Makino ................ G06Q 20/108 705/43 |
| 2002/0045472 | A1 | 4/2002 | Adams |
| 2002/0142825 | A1 | 10/2002 | Lark et al. |
| 2002/0142846 | A1 | 10/2002 | Paulsen |
| 2002/0173354 | A1 | 11/2002 | Winans et al. |
| 2002/0183105 | A1 | 12/2002 | Cannon et al. |
| 2002/0194505 | A1 | 12/2002 | Muschenborn |
| 2003/0027624 | A1 | 2/2003 | Gilmore et al. |
| 2003/0032478 | A1 | 2/2003 | Takahama et al. |
| 2003/0032479 | A1 | 2/2003 | LeMay et al. |
| 2003/0064771 | A1 | 4/2003 | Morrow et al. |
| 2003/0064801 | A1 | 4/2003 | Breckner et al. |
| 2003/0069074 | A1 | 4/2003 | Jackson |
| 2003/0083943 | A1 | 5/2003 | Adams et al. |
| 2003/0087690 | A1 | 5/2003 | Loose et al. |
| 2003/0130028 | A1 | 7/2003 | Aida et al. |
| 2003/0162582 | A1 | 8/2003 | Gordon |
| 2003/0176214 | A1 | 9/2003 | Burak et al. |
| 2003/0222876 | A1 | 12/2003 | Giemborek et al. |
| 2003/0236114 | A1 | 12/2003 | Griswold et al. |
| 2004/0009813 | A1 | 1/2004 | Wind |
| 2004/0023714 | A1 | 2/2004 | Asdale |
| 2004/0029636 | A1 | 2/2004 | Wells |
| 2004/0048671 | A1 | 3/2004 | Rowe |
| 2004/0063490 | A1 | 4/2004 | Okada |
| 2004/0066475 | A1 | 4/2004 | Searle |
| 2004/0087360 | A1 | 5/2004 | Chamberlain et al. |
| 2004/0103444 | A1 | 5/2004 | Weinberg et al. |
| 2004/0110557 | A1 | 6/2004 | Rowe |
| 2004/0116178 | A1 | 6/2004 | Okada |
| 2004/0117484 | A1 | 6/2004 | Singer et al. |
| 2004/0127284 | A1 | 7/2004 | Walker et al. |
| 2004/0147303 | A1 | 7/2004 | Imura et al. |

(56) References Cited

U.S. PATENT DOCUMENTS

| | | | | |
|---|---|---|---|---|
| 2004/0150162 | A1 | 8/2004 | Okada | |
| 2004/0162146 | A1 | 8/2004 | Ooto | |
| 2004/0166925 | A1 | 8/2004 | Emori et al. | |
| 2004/0171423 | A1 | 9/2004 | Silva et al. | |
| 2004/0180712 | A1 | 9/2004 | Forman et al. | |
| 2004/0180721 | A1 | 9/2004 | Rowe | |
| 2004/0183972 | A1 | 9/2004 | Bell | |
| 2004/0192430 | A1 | 9/2004 | Burak et al. | |
| 2004/0198485 | A1 | 10/2004 | Loose | |
| 2004/0207154 | A1 | 10/2004 | Okada | |
| 2004/0208126 | A1 | 10/2004 | Wassew et al. | |
| 2004/0209666 | A1 | 10/2004 | Okada et al. | |
| 2004/0209667 | A1 | 10/2004 | Emori et al. | |
| 2004/0209668 | A1 | 10/2004 | Okada | |
| 2004/0209671 | A1 | 10/2004 | Okada | |
| 2004/0209678 | A1 | 10/2004 | Okada | |
| 2004/0209683 | A1 | 10/2004 | Okada | |
| 2004/0214635 | A1 | 10/2004 | Okada | |
| 2004/0214637 | A1 | 10/2004 | Nonaka | |
| 2004/0219968 | A1 | 11/2004 | Fiden et al. | |
| 2004/0224747 | A1 | 11/2004 | Okada | |
| 2004/0233663 | A1 | 11/2004 | Emslie et al. | |
| 2004/0239582 | A1 | 12/2004 | Seymour | |
| 2004/0254010 | A1 | 12/2004 | Fine | |
| 2005/0020348 | A1 | 1/2005 | Thomas et al. | |
| 2005/0020358 | A1 | 1/2005 | Cram | |
| 2005/0026670 | A1* | 2/2005 | Lardie | G07F 17/32 463/16 |
| 2005/0032571 | A1 | 2/2005 | Asonuma | |
| 2005/0037843 | A1 | 2/2005 | Wells et al. | |
| 2005/0043086 | A1 | 2/2005 | Schneider | |
| 2005/0049032 | A1 | 3/2005 | Kobayashi | |
| 2005/0049046 | A1 | 3/2005 | Kobayashi | |
| 2005/0059494 | A1 | 3/2005 | Kammler | |
| 2005/0062410 | A1 | 3/2005 | Bell et al. | |
| 2005/0063055 | A1 | 3/2005 | Engel | |
| 2005/0079913 | A1 | 4/2005 | Inamura | |
| 2005/0085292 | A1 | 4/2005 | Inamura | |
| 2005/0153772 | A1 | 7/2005 | Griswold et al. | |
| 2005/0153775 | A1 | 7/2005 | Griswold et al. | |
| 2005/0153776 | A1 | 7/2005 | LeMay et al. | |
| 2005/0164762 | A1 | 7/2005 | Smith et al. | |
| 2005/0192090 | A1 | 9/2005 | Muir et al. | |
| 2005/0193269 | A1 | 9/2005 | Haswell et al. | |
| 2005/0206582 | A1 | 9/2005 | Bell et al. | |
| 2005/0208994 | A1 | 9/2005 | Berman | |
| 2005/0215311 | A1 | 9/2005 | Hornik et al. | |
| 2005/0233799 | A1 | 10/2005 | LeMay et al. | |
| 2005/0239539 | A1 | 10/2005 | Inamura | |
| 2005/0266912 | A1 | 12/2005 | Sekiguchi | |
| 2005/0282638 | A1 | 12/2005 | Rowe | |
| 2005/0285337 | A1 | 12/2005 | Durham et al. | |
| 2006/0009273 | A2 | 1/2006 | Moshal | |
| 2006/0041586 | A1 | 2/2006 | Nassef, Jr. | |
| 2006/0063581 | A1 | 3/2006 | Harris et al. | |
| 2006/0068898 | A1 | 3/2006 | Maya | |
| 2006/0079333 | A1 | 4/2006 | Morrow et al. | |
| 2006/0089194 | A1 | 4/2006 | Joshi et al. | |
| 2006/0094508 | A1 | 5/2006 | D'Amico et al. | |
| 2006/0100014 | A1 | 5/2006 | Griswold et al. | |
| 2006/0103951 | A1 | 5/2006 | Bell et al. | |
| 2006/0105837 | A1 | 5/2006 | Walker et al. | |
| 2006/0105841 | A1 | 5/2006 | Rom et al. | |
| 2006/0125745 | A1 | 6/2006 | Evanicky | |
| 2006/0143085 | A1 | 6/2006 | Adams et al. | |
| 2006/0154729 | A1 | 7/2006 | LeMay et al. | |
| 2006/0166727 | A1 | 7/2006 | Burak | |
| 2006/0184626 | A1 | 8/2006 | Agapi et al. | |
| 2006/0190482 | A1 | 8/2006 | Kishan et al. | |
| 2006/0191177 | A1 | 8/2006 | Engel | |
| 2006/0217202 | A1 | 9/2006 | Burke et al. | |
| 2006/0264256 | A1 | 11/2006 | Gagner et al. | |
| 2006/0264257 | A1 | 11/2006 | Jaffe et al. | |
| 2006/0282855 | A1 | 12/2006 | Margulis | |
| 2006/0284574 | A1 | 12/2006 | Emslie et al. | |
| 2006/0290594 | A1 | 12/2006 | Engel et al. | |
| 2007/0004510 | A1 | 1/2007 | Underdahl et al. | |
| 2007/0004513 | A1 | 1/2007 | Wells et al. | |
| 2007/0010315 | A1 | 1/2007 | Hein | |
| 2007/0015569 | A1 | 1/2007 | Norton et al. | |
| 2007/0024002 | A1 | 2/2007 | McMain et al. | |
| 2007/0032288 | A1 | 2/2007 | Nelson et al. | |
| 2007/0043616 | A1 | 2/2007 | Kutaragi et al. | |
| 2007/0060317 | A1 | 3/2007 | Martin | |
| 2007/0180400 | A1 | 8/2007 | Zotov et al. | |
| 2007/0243925 | A1 | 10/2007 | LeMay et al. | |
| 2007/0243928 | A1 | 10/2007 | Iddings | |
| 2007/0243934 | A1 | 10/2007 | Little et al. | |
| 2008/0008188 | A1 | 1/2008 | Buga et al. | |
| 2008/0009344 | A1 | 1/2008 | Graham et al. | |
| 2008/0020816 | A1 | 1/2008 | Griswold et al. | |
| 2008/0020839 | A1 | 1/2008 | Wells et al. | |
| 2008/0020840 | A1 | 1/2008 | Wells et al. | |
| 2008/0020841 | A1 | 1/2008 | Wells et al. | |
| 2008/0076574 | A1 | 3/2008 | Okada | |
| 2008/0096655 | A1 | 4/2008 | Rasmussen et al. | |
| 2008/0113747 | A1 | 5/2008 | Williams et al. | |
| 2008/0125219 | A1 | 5/2008 | Williams et al. | |
| 2009/0098943 | A1 | 4/2009 | Weber et al. | |
| 2009/0104954 | A1 | 4/2009 | Weber et al. | |
| 2009/0156303 | A1 | 6/2009 | Kiely et al. | |
| 2009/0233705 | A1 | 9/2009 | LeMay et al. | |
| 2010/0105454 | A1 | 4/2010 | Weber et al. | |

FOREIGN PATENT DOCUMENTS

| | | | | |
|---|---|---|---|---|
| EP | 0454423 | | 10/1991 | |
| EP | 0484103 | | 5/1992 | |
| EP | 0769769 | | 4/1997 | |
| EP | 0997857 | | 10/1999 | |
| EP | 1195184 | | 4/2002 | |
| EP | 1255234 | | 11/2002 | |
| EP | 1260928 | | 11/2002 | |
| EP | 1282088 | | 2/2003 | |
| EP | 1462152 | | 9/2004 | |
| EP | 1492063 | | 12/2004 | |
| EP | 1524617 | | 4/2005 | |
| GB | 1464896 | | 2/1977 | |
| GB | 2120506 | | 11/1983 | |
| WO | WO/1998/052665 | | 11/1998 | |
| WO | WO/1999/042889 | | 8/1999 | |
| WO | WO/1999/044095 | | 9/1999 | |
| WO | WO/2001/015127 | | 3/2001 | |
| WO | WO/2001/015128 | | 3/2001 | |
| WO | WO/2001/015132 | | 3/2001 | |
| WO | WO/2001/009664 | | 8/2001 | |
| WO | WO/2002/073501 | | 9/2002 | |
| WO | WO/2003/023647 | | 3/2003 | |
| WO | WO/2003/039699 | | 5/2003 | |
| WO | WO/2004/001486 | | 12/2003 | |
| WO | WO/2004/102520 | | 11/2004 | |
| WO | WO 2005070509 | A1 * | 8/2005 | G07F 17/32 |
| WO | WO 2005/099839 | * | 10/2005 | G07F 17/32 |
| WO | WO/2006/033986 | | 3/2006 | |
| WO | WO/2006/034192 | | 3/2006 | |
| WO | WO/2006/038819 | | 4/2006 | |
| WO | WO/2006/039132 | | 4/2006 | |
| WO | WO/2007/032916 | | 3/2007 | |
| WO | WO/2007/040413 | | 4/2007 | |
| WO | WO/2007/120444 | | 10/2007 | |
| WO | WO/2007/120450 | | 10/2007 | |
| WO | WO/2008/061068 | | 5/2008 | |
| WO | WO/2009/009269 | | 1/2009 | |
| WO | WO/2009/036445 | | 3/2009 | |
| WO | WO/2009/140096 | | 11/2009 | |
| WO | WO/2009/143274 | | 11/2009 | |
| WO | WO/2010/056418 | | 5/2010 | |
| WO | WO/2010/120451 | | 10/2010 | |

* cited by examiner

VIDEO GAMING DEVICE HAVING A SYSTEM AND METHOD FOR COMPLETING WAGERS

PRIORITY CLAIM

This application is a continuation of, claims priority to and the benefit of U.S. patent application Ser. No. 11/305,796, filed on Dec. 16, 2005, which claims priority to and the benefit of U.S. Provisional Patent Application No. 60/636,733, filed on Dec. 16, 2004, the entire contents of each are incorporated by reference herein.

BACKGROUND OF THE INVENTION

1. Field of the Invention

This invention relates generally to the video electronic game of chance and more particularly, to a system and method for allowing a player to make additional gaming wagers on games offered by the gaming establishment and also purchase items available for sale during the cash out process.

2. Description of Prior Art

The gaming industry has been using video electronic games of chance such as video poker for many years to entertain players and generate revenue for its establishments. While the number of different types of video games available to the player has increased dramatically over the past few years, the versatility of the electronic gaming devices to allow the player to use his winnings for other purposes besides playing that game has not changed much.

A typical video electronic game of chance requires the player to insert a wagerable amount of money into that particular device each time the player wishes to play a certain game. If the player wants to play video poker, he must find a video poker machine which is available and insert money into the device to play. If the player wants to play video Keno, he must find a video Keno machine which is available and insert money into the device to play. If the player wants to place a wager on a sporting event he must go to the gaming establishments sports book and place a separate wager. If the player wants to go to a show that is playing in town, he must go to the gaming establishments event reservations to purchase the tickets. All of this takes time away from the player from gambling and creates inefficiencies for the gaming establishment.

A need exists for a more flexible and versatile use of the video electronic game of chance cash out system. The gaming establishment can increase revenue and improve patronage efficiency and overall experience by providing versatility to the video electronic game of chance.

SUMMARY OF THE INVENTION

Video electronic games of chance have become extremely popular over the past few years. Casinos which have grown tremendously in popularity generate a large amount of their daily revenue from video electronic games of chance (Video Poker is just one example of these video slot machine games). This invention involves allowing a player playing a video electronic game of machine to make a separate wager on a different game of chance such as lottery or keno being conducted at the gaming establishment or elsewhere prior to the player ending its gaming session on the video electronic game of machine. Currently, when a player ends their session of play on a video electronic games of chance they typically push a "cash out" button to have any money or credits owed to them returned either through cash or voucher. In the present invention, when the player pushes the "cash out" button a menu pops up on the screen asking the player whether they would be interested in making a wager or purchasing a ticket related to a different game of chance such as a lottery ticket, keno ticket of sports wagering. The cost of the ticket will then be deducted from the money or credits on the video slot machine and the machine will then dispense the wagering ticket to the player along with any monies owed to the player. The player will also be give an option to purchase items sold by the gaming establishment such as tickets to a show.

An objective of this invention is to provide additional options for the player during the cash out process while playing a video electronic game of chance other than receiving money or ticket voucher.

An objective of this invention is to allow a player to play other games of chance offered by the gaming establishment such as placing a wager on a sporting event while playing on a video electronic game of chance.

An objective of this invention is to allow a player to purchase items offered by the gaming establishment such as purchasing a ticket to a show while playing a video electronic game of chance.

An objective of this invention is to have a device that allows a player to have the option to play many different game of chance from the same device and also purchase items using the money the player has accrued while playing a video electronic game of chance.

DETAILED DESCRIPTION OF THE PREFERRED EMBODIMENTS

Figure 1:
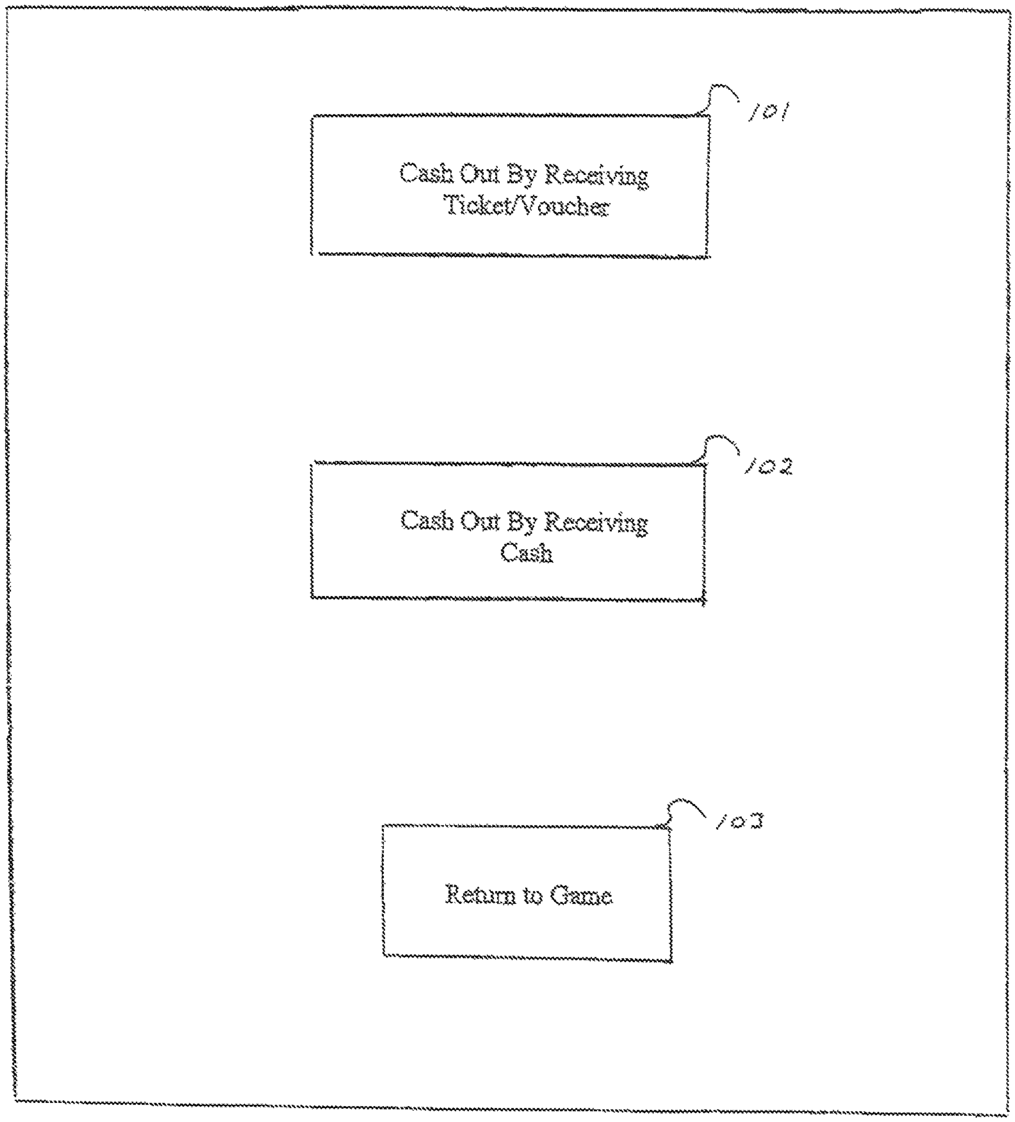
FIG. 1 is an example of the gaming device's cash out menu window.

FIG. 1 shows an enlarged front view of the video monitor of the gaming device illustrating the preferred cash out menu embodiment of the present invention. When the player presses or selects the cash out button or selector on the gaming device, the monitor displays a cash out menu similar to the menu shown in FIG. 1. A method for operating the present invention is discussed below in association with FIG. 6.

Figure 7:
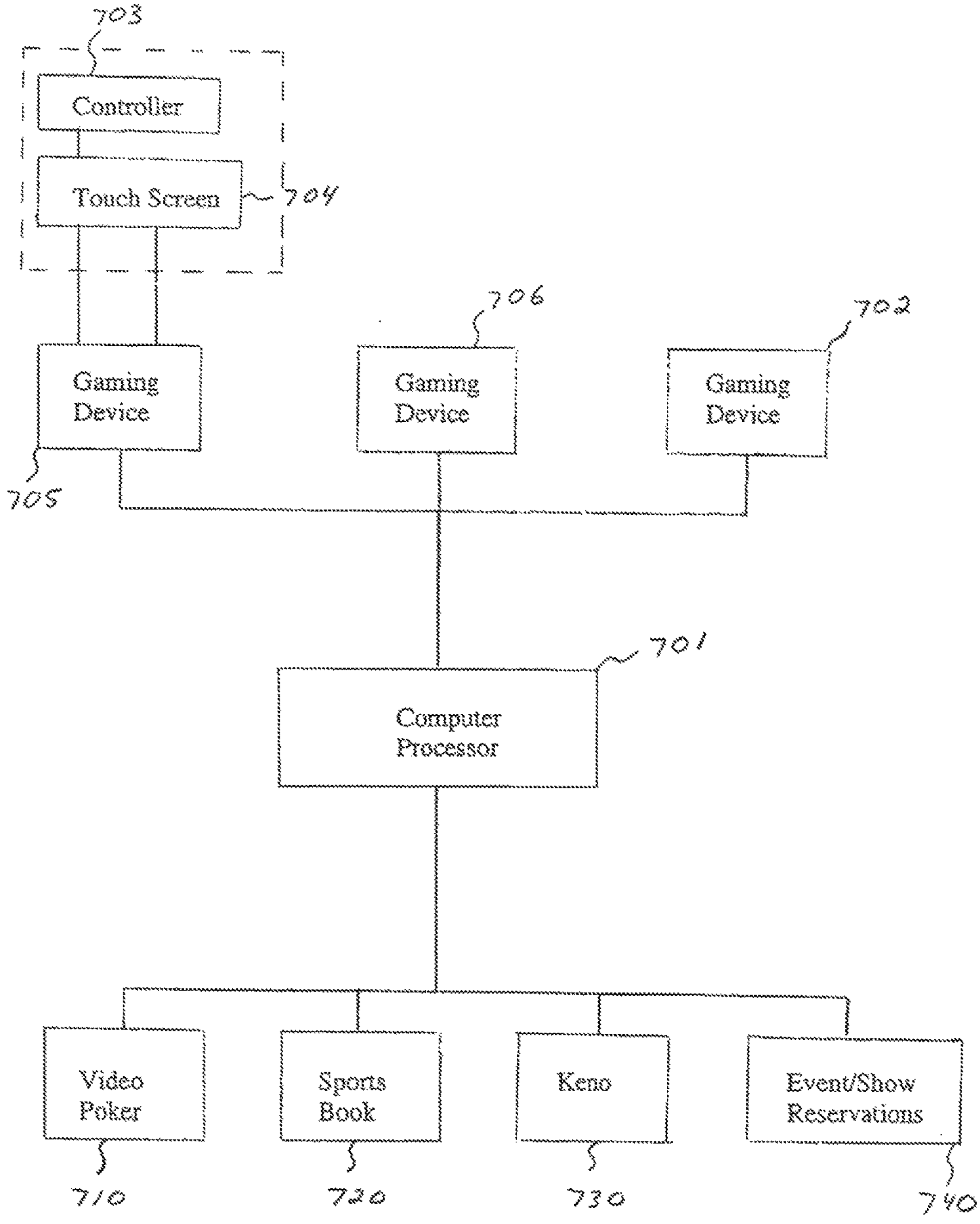
FIG. 7 is a schematic block diagram of the electronic configuration of one embodiment of the gaming device of the present invention.

As illustrated in FIG. 7, the general electronic configuration of the invention preferably includes: a primary computer processor 701 which allows communications to occur between the gaming devices 702 and the gaming establishments event/show reservation system 740, video poker gaming devices 720, Keno game 730, Race and Sports book and any other gaming or non-gaming electronic system the gaming establishment wants to allow access too. The present invention is preferably embodied in a video monitor having a touch screen 704 and associated touch screen technology along with a controller 703.

Figure 6:
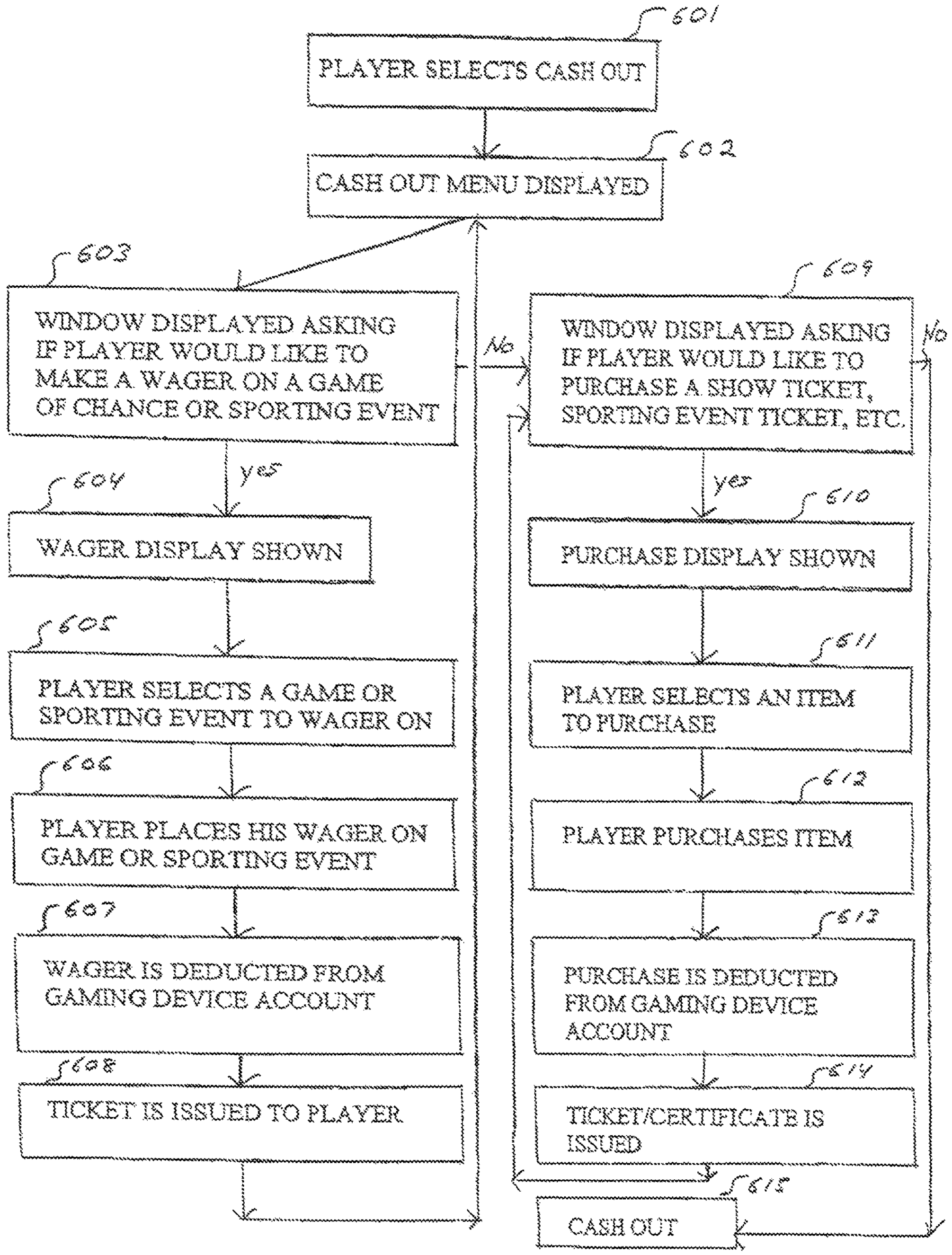
FIG. 6 is a flow chart illustrating the operation of the gaming device.

FIG. 6 shows a schematic flow diagram illustration one operating method of the present invention. It should be understood that individuals skilled in the art of computer programming and video gaming device design can most certainly create many different but similar operating methods in the future for the embodiments described herein. The following disclosure is not meant to limit the present invention to the operating method described in FIG. 6 herein.

Referring to FIG. 6, preferably upon the player's selection of the cash out button or selector 601 on the gaming device such as a video poker slot machine or any other gaming device that contains a monitor, the game displays a cash out menu 602 as indicated in FIG. 1. According to FIG. 1, after the cash out menu is displayed, the player can: (i) execute a ticket cash out as indicated by 101; (ii) execute a cash cash out as indicated by 102; or (iii) return to the game that was being played as indicated by 103. These option are completed when the player touches the video screen in the area indicated by 101, 102 and 103 on FIG. 1.

Figure 2:
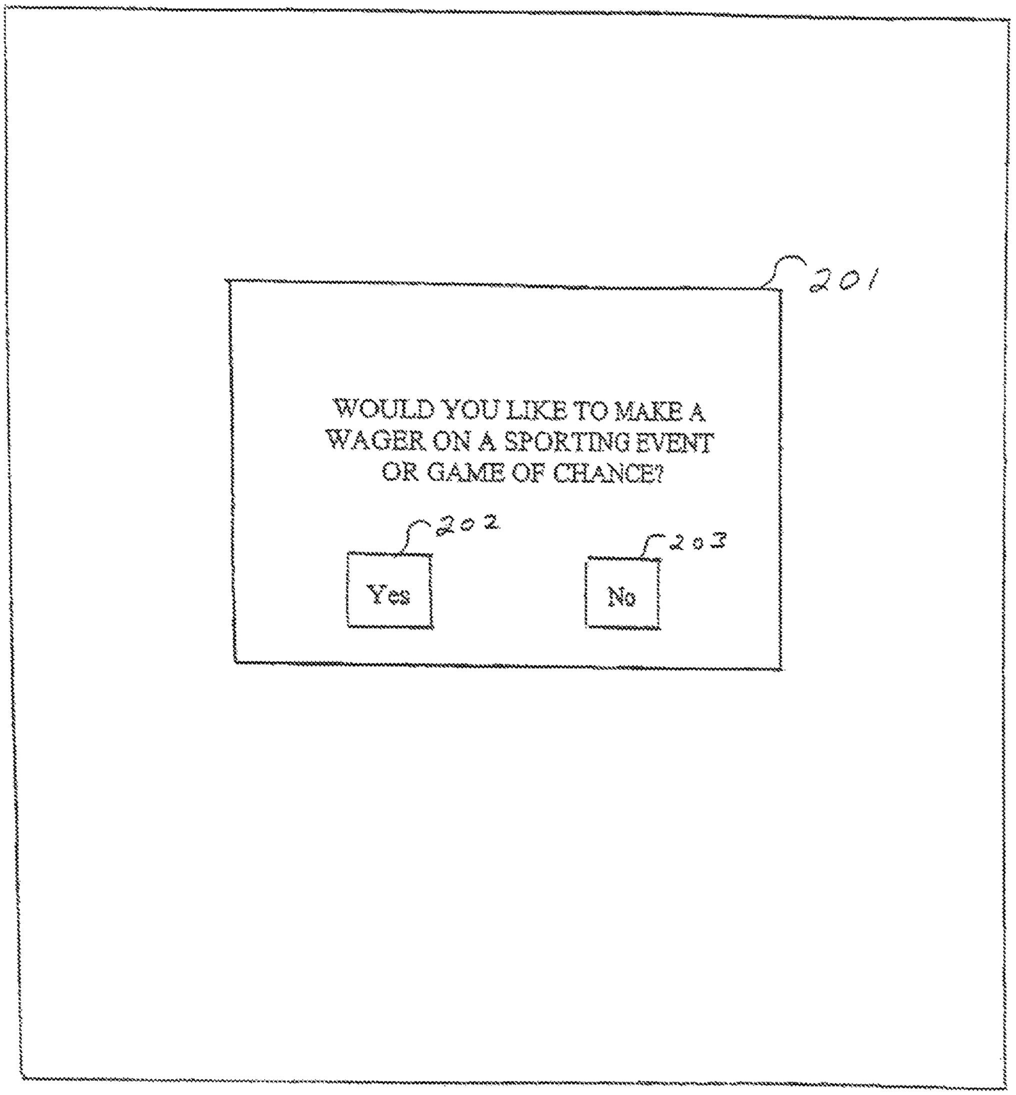
FIG. 2 is an example of the gaming device's wager option window.
Figure 4:
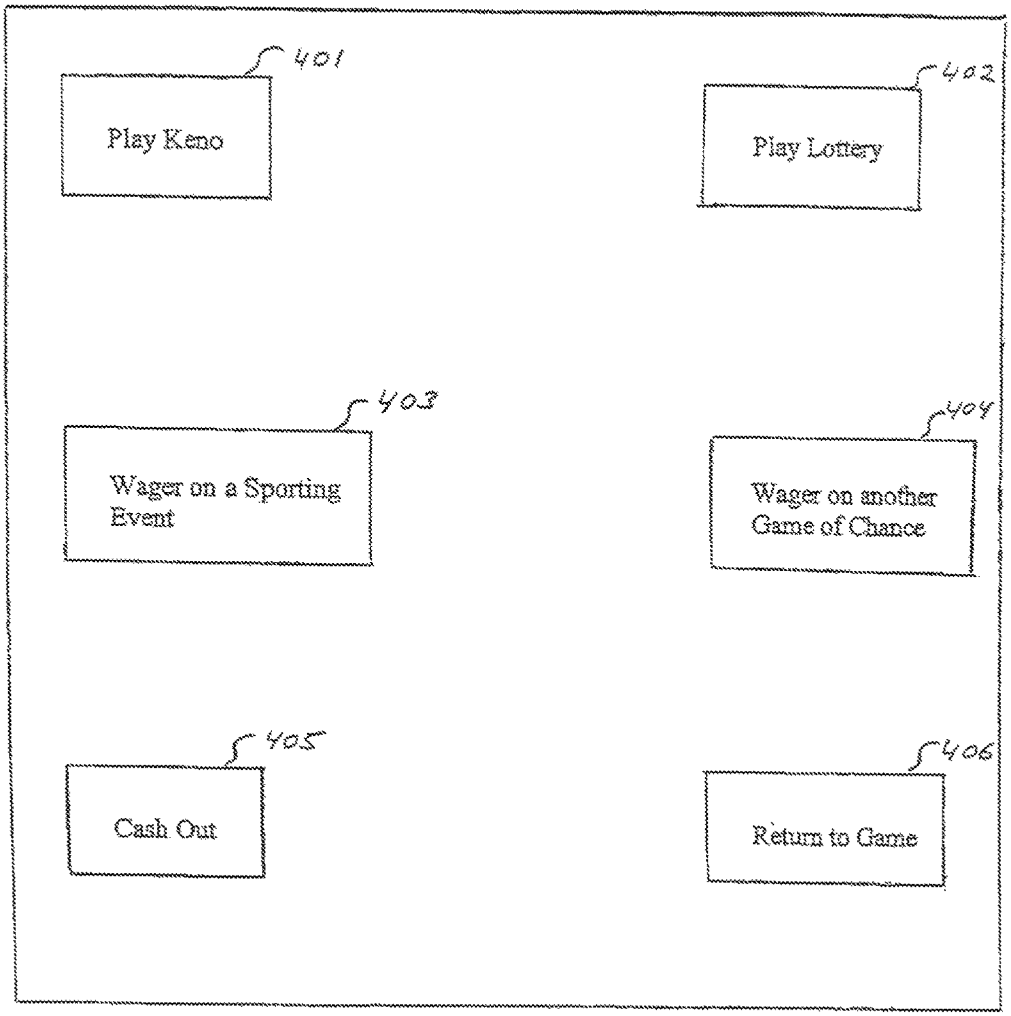
FIG. 4 is an example of the gaming device's wager menu window

Upon the player selecting a ticket cash out option 101 or cash cash out option 102, a wager option window is displayed on the monitor which asks the player whether the player would like to make a wager on a sporting event or game of chance 603 as shown in FIG. 2 and represented by 201. If the player selects yes by touching the screen as indicated by 202, a wager menu window is displayed on the monitor indicating what wagers can be made 604 similar to what is shown in FIG. 4. The preferred embodiment gives the player several different options including: (i) wagering on a keno game 401; (2) wagering on a lottery game 402; (iii) wagering on a sporting event 403; (iv) wagering on some other game of chance 404; (v) cashing out 405; or (vi) returning to the game that was being played on the gaming device 406. The Player selects which option he would desire by touching the video screen in the appropriate location. If the player places a wager 605, the amount of the wagered amount is then deducted from the cash out amount being held in memory by the gaming device 607. After the wager transaction is completed, the player is issued a wager ticket from the gaming device 608. After the wager ticket is issued, the monitor redisplays the wager option window asking whether the player would like to make a wager on a sporting event or game of chance 603.

Figure 3:
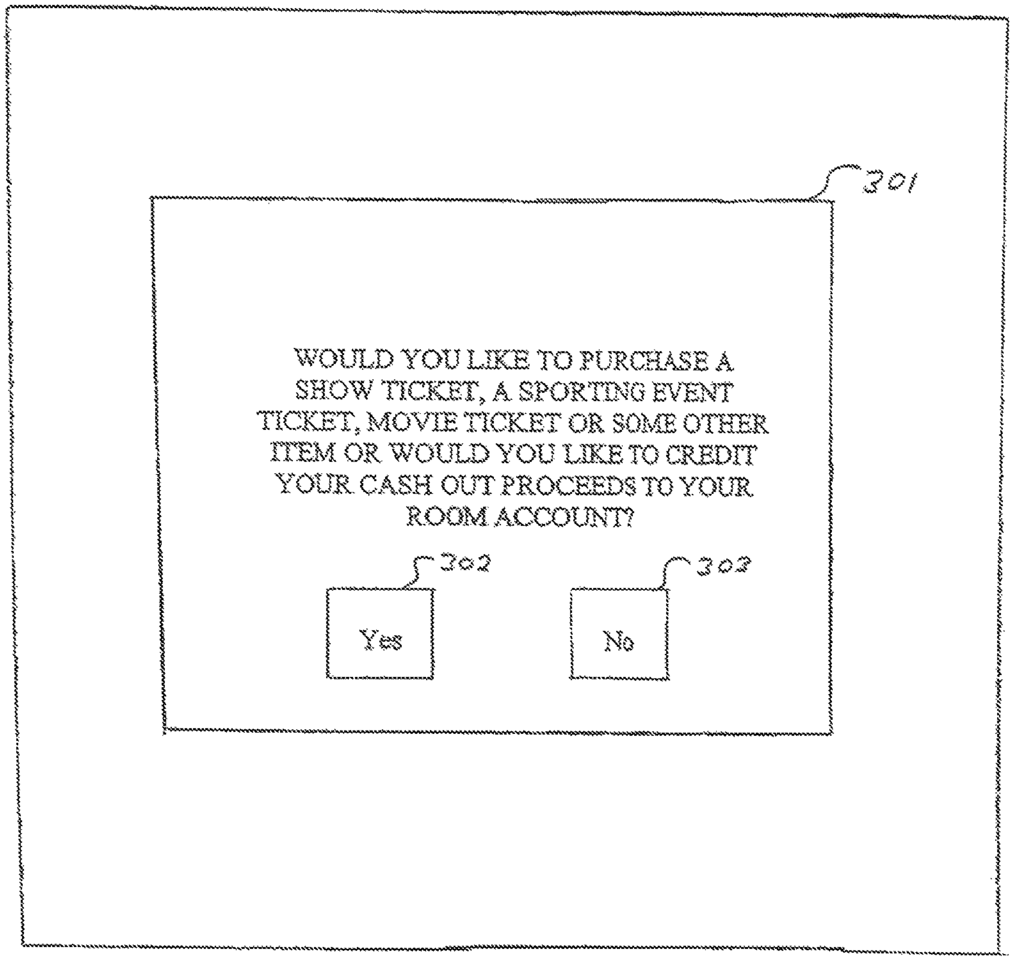
FIG. 3 is an example of the gaming device's purchase option window.
Figure 5:
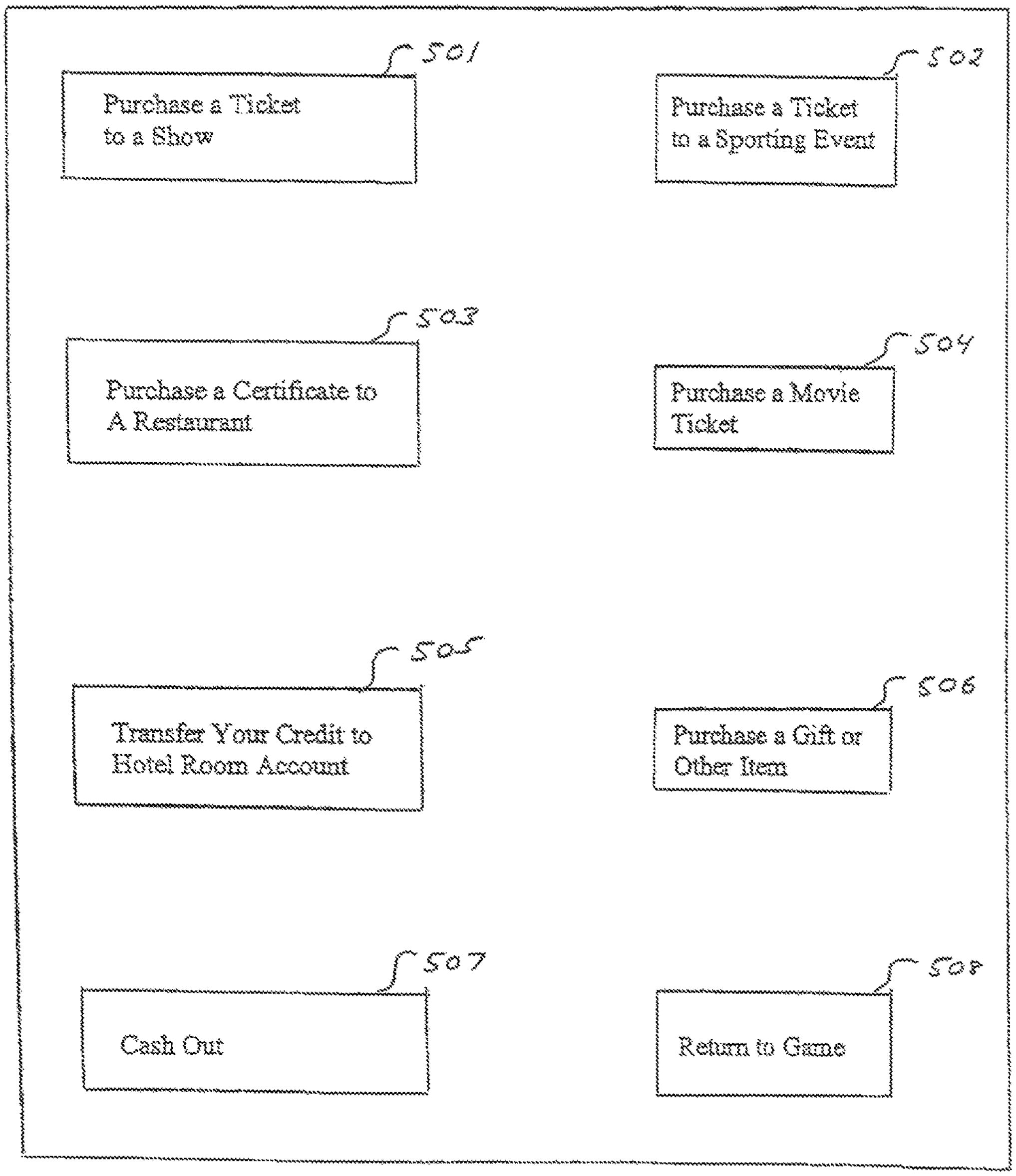
FIG. 5 is an example of the gaming device's purchase menu window.

Referring to FIG. 2, if the player selects No by touching the video screen as indicated by 203, a purchase option window is displayed asking whether the player would like to purchase a show ticket, sporting event ticket, etc. similar to what is shown in FIG. 3 and represented by 301. If the player selects yes by touching the screen as indicated by box 302, a purchase menu window is displayed on the monitor indicating what purchases can be made 610 similar to what is shown in FIG. 5. The preferred embodiment gives the player several different options including: (i) purchasing a Ticket to a show 501; (2) purchasing a ticket to a sporting event 502; (iii) purchasing a certificate to a restaurant 503; (iv) purchasing a ticket to a movie 504; (v) transferring the credit on the gaming device to the players hotel room account 505; (vi) purchasing a gift or other item 506; (vii) cashing out 507; or returning to the game that was being played on the gaming device 508. The Player selects which option he would desire by touching the video screen in the appropriate location 611. If the player makes a purchase 612, the amount of the purchase is then deducted from the cash out amount being held in memory by the gaming device 613. After the wager transaction is completed, the player is issued a purchase ticket or certificate from the gaming device 614. After the purchase ticket or certificate is issued, the monitor redisplays purchase option window asking whether the player would like to make a purchase 609. If the player selects No, the gaming device cashes the Player out based upon the option chosen during the cash out menu display 602.

If the player selected cash cash out option then the gaming device will dispense coins or currency to the player while if the player selected ticket cash out the gaming device will dispense a ticket or voucher representing the amount owed to the player.

Another preferred embodiment of the invention has the cash out option menu is displayed when the player initially inserts money, credit card or the gaming establishments player's card into the gaming device.

The invention is claimed as follows:

1. An electronic gaming machine comprising:

a display device;

a payment acceptor;

a sporting event wager ticket dispenser;

a processor; and a memory device which stores a plurality of instructions, which when executed by the processor, cause the processor to:

responsive to a physical item being received via the payment acceptor, modify a credit balance based, at least in part, on a monetary value associated with the received physical item, said physical item being selected from the group consisting of: a cash-in ticket associated with the monetary value and a unit of currency, responsive to a determination that an amount of the credit balance is at least a minimum wager amount, enable a placement of a first wager on a play of a local game, responsive to the first wager being placed on the play of the local game:

reduce the amount of the credit balance, determine a local game outcome for the play of the local game, cause the display device to display, in a game window, the determined local game outcome, determine any local game award associated with the determined local game outcome, and cause the display device to display any determined local game award, and responsive to a triggering event occurring:

cause the display device to display, in a wager menu window, a second wager available to be placed on a sporting event, said sporting event being different from the local game, and responsive to receipt of an input to place the second wager on the sporting event:

communicate, to a race and sports book, data associated with a placement of the second wager on the sporting event, and responsive to receipt, from the race and sports book, of data associated with a completion of the placement of the second wager on the sporting event:

reduce the amount of the credit balance based on the placement of the second wager on the sporting event, and issue, via the sporting event wager ticket dispenser, a sporting event wager ticket associated with the placement of the second wager on the sporting event.

2. The electronic gaming machine of claim 1, wherein when executed by the processor, the plurality of instructions cause the processor to cause the display device to display, in a ticket purchase menu, a ticket available to be purchased to attend the sporting event.

3. The electronic gaming machine of claim 1, wherein the triggering event includes at least one input made by a player.

4. The electronic gaming machine of claim 3, wherein the at least one input includes a cash-out input.

5. The electronic gaming machine of claim 1, wherein when executed by the processor responsive to the triggering event occurring, the plurality of instructions cause the processor to cause the display device to display, in the wager menu window, a plurality of different wagers available to be placed on a plurality of different sporting events.

6. A method of operating an electronic gaming machine, said method comprising:

responsive to a physical item being received via a payment acceptor, establishing a credit balance based, at least in part, on a monetary value associated with the received physical item, said physical item being selected from the group consisting of: a cash-in ticket associated with the monetary value and a unit of currency, responsive to a determination that an amount of the credit balance is at least a minimum wager amount, enabling a placement of a first wager on a play of a local game, responsive to the first wager being placed on the play of the local game:

reducing the amount of the credit balance, determining, by a processor, a local game outcome for the play of the local game, causing a display device to display, in a game window, the determined local game outcome, determining, by the processor, any local game award associated with the determined local game outcome, and causing the display device to display any determined local game award, and responsive to a triggering event occurring:

causing the display device to display, in a wager menu window, a second wager available to be placed on a sporting event, said sporting event being different from the local game, and responsive to receipt of an input to place the second wager on the sporting event:

communicating, to a race and sports book, data associated with a placement of the second wager on the sporting event, and responsive to receipt, from the race and sports book, of data associated with a completion of the placement of the second wager on the sporting event:

reducing the amount of the credit balance based on the placement of the second wager on the sporting event, and issuing, by a sporting event wager ticket dispenser, a sporting event wager ticket associated with the placement of the second wager on the sporting event.

7. The method of claim 6, further comprising causing the display device to display, in a ticket purchase menu, a ticket available to be purchased to attend the sporting event.

8. The method of claim 6, wherein the triggering event includes at least one input made by a player.

9. The method of claim 8, wherein the at least one input includes a cash-out input.

10. The method of claim 6, which includes, responsive to the triggering event occurring, causing the display device to display, in the wager menu window, a plurality of different wagers available to be placed on a plurality of different sporting events.

11. The method of claim 6, which is executed through a data network.

* * * * *